United States Patent
Engstrand et al.

(10) Patent No.: US 10,503,726 B2
(45) Date of Patent: Dec. 10, 2019

(54) REDUCING FRONTEND COMPLEXITY FOR MULTIPLE MICROSERVICES WITH CONSISTENT UPDATES

(71) Applicant: Adobe Inc., San Jose, CA (US)

(72) Inventors: Glenn Engstrand, El Sobrante, CA (US); Peng Wang, Dublin, CA (US)

(73) Assignee: Adobe Inc., San Jose, CA (US)

( * ) Notice: Subject to any disclaimer, the term of this patent is extended or adjusted under 35 U.S.C. 154(b) by 236 days.

(21) Appl. No.: 15/850,404

(22) Filed: Dec. 21, 2017

(65) Prior Publication Data

US 2019/0197148 A1 Jun. 27, 2019

(51) Int. Cl.
G06F 11/14 (2006.01)
G06F 16/23 (2019.01)
G06F 9/54 (2006.01)

(52) U.S. Cl.
CPC .......... *G06F 16/2365* (2019.01); *G06F 9/546* (2013.01); *G06F 11/1469* (2013.01); *G06F 16/2379* (2019.01); *G06F 2201/80* (2013.01); *G06F 2201/805* (2013.01); *G06F 2201/82* (2013.01)

(58) Field of Classification Search
CPC ...... G06F 11/14; G06F 11/1469; G06F 17/30; G06F 17/30371; G06F 17/30777

USPC .......................................................... 714/19
See application file for complete search history.

(56) References Cited

U.S. PATENT DOCUMENTS

| | | | |
|---|---|---|---|
| 6,377,960 B1 * | 4/2002 | Qiu | G06F 16/219 |
| 10,216,449 B1 * | 2/2019 | Li | G06F 11/1451 |
| 2008/0215925 A1 * | 9/2008 | Degenaro | G06F 11/263 |
| | | | 714/41 |
| 2016/0124742 A1 * | 5/2016 | Rangasamy | H04L 47/70 |
| | | | 717/103 |
| 2017/0187785 A1 * | 6/2017 | Johnson | H04L 67/10 |
| 2017/0242784 A1 * | 8/2017 | Heorhiadi | H04L 41/5038 |
| 2018/0077038 A1 * | 3/2018 | Leff | H04L 43/0823 |
| 2018/0307514 A1 * | 10/2018 | Koutyrine | G06F 9/45558 |
| 2019/0180258 A1 * | 6/2019 | Amar | G06Q 20/1085 |

* cited by examiner

*Primary Examiner* — Kamini B Patel
(74) *Attorney, Agent, or Firm* — Finch & Maloney PLLC (57) ABSTRACT

Techniques for achieving consistency across data layers associated with multiple microservices. An always strictly consistent microservice coordination system provides immediate consistency for data stored across multiple microservices. A strictly successful eventually consistent multiple microservice coordination system provides eventual consistency for data stored across multiple microservices.

20 Claims, 7 Drawing Sheets

REDUCING FRONTEND COMPLEXITY FOR MULTIPLE MICROSERVICES WITH CONSISTENT UPDATES

FIELD OF THE DISCLOSURE

This disclosure relates to techniques for managing microservices. In particular, this disclosure relates to techniques for providing consistent updates across multiple microservices having independent data layers.

BACKGROUND

Microservices is a variant of the service-oriented architecture ("SOA") architectural style that structures an application as a collection of loosely coupled services. The central idea behind microservices is that some types of applications become easier to build and maintain when they are broken down into smaller, composable pieces which work together. Each component is continuously developed and separately maintained, and the application is composed of the sum of its constituent components. In contrast to a traditional "monolithic" application, which is developed as one integrated unit, microservices applications are built as a set of modular components, easier to understand, easier to test, and easier to maintain over the life of the application.

In more detail, in a microservices architecture, services are typically fine-grained utilizing lightweight protocols. Each service is elastic, resilient, composable, minimal, and complete. Microservice design principles embrace failure and faults, similar to anti-fragile systems. Applications built using the microservice architecture tend to use lightweight, open-source technologies. The services communicate via so-called 'dumb pipes', such as a message broker or lightweight protocols such as RESTful ("Representational State Transfer") or RPC ("Remote Procedure Call"). The benefit of decomposing an application into different smaller services (microservices) is that it improves modularity and makes the application easier to understand, develop and test. It also parallelizes development by enabling small autonomous teams to develop, deploy and scale their respective services independently of other teams. Further, it allows the architecture of an individual service to emerge through continuous refactoring whereby different development teams work on independently deployable units of code. To this end, microservices-based architectures enable continuous delivery and deployment so that organizations can achieve higher agility and reduce the time it takes to achieve working improvements to productivity.

A characteristic of the microservice architecture is that the services are loosely coupled. One way to achieve loose coupling is by each service having its own data store and associated data application programming interface (API). In an online store, for example, an OrderService may utilize a database that includes an ORDERS table. Similarly, a CustomerService may utilize a separate database, which includes a CUSTOMERS table. At development time, a developer can change a service's schema without having to coordinate with developers working on another service. At runtime, the services are isolated from each other. One benefit of such loose coupling is that a given microservice will never be blocked because another microservice holds a database lock, for example. Moreover, each microservice is usually considered to have its own domain model.

An unsolved problem inherent in such loose coupling of the microservices architecture is achieving consistency across the respective data layers associated with each microservice (i.e., insuring consistency of the relationships between data stored across different microservices). While each microservice may utilize its own database and data API, data stored across multiple microservices is typically related and thus the data stored in a data store for one microservice is correlated to data stored in a data store for another microservice. Typically, each microservice's persistent data is private to that service and accessible only via its data API. However, objects that are shared across the entirety of the microservices architecture, may reside in multiple microservices data stores. For example, objects may reside across multiple data stores associated with different microservices in a parent child relationship. Handling a situation in which one transaction succeeds on one or more microservices and fails on others creates significant potential for data inconsistencies and errors. In particular, users desire the emotional security of strict consistency. Thus, usable GUI applications should be designed in such a way as to provide the illusion of strict consistency even when the underlying APIs are eventually consistent. As an example, a user typically desires to know right away whether or not they were able to secure concert tickets when booking online because the next step is securing dinner reservation. If that person was not able to secure concert tickets, a confirmation that the funds were refunded to a credit card sometime between now and the next billing cycle would typically be required.

Although there exist methods such as two-phase commit and event sourcing to insure consistency of objects stored across data stores especially in the case if one or more microservices fail or some other system fault occurs (e.g., failure of an API gateway) in performing a transaction with respect to their data layer, they have associated disadvantages. In particular, two-phase commit requires that each microservice keeps transactions open across API calls. This approach is very fragile because the databases can become unresponsive quickly even when the microservices are working in only a slightly degraded state. Event sourcing, on the other hand, requires that all state mutating API calls to be eventually consistent. This approach increases the complexity of the GUI or application that calls these APIs.

DETAILED DESCRIPTION

The present disclosure describes techniques for achieving consistency across data layers associated with different microservices. The techniques are helpful in eliminating or otherwise reducing errors in situations where in a given microservices architecture one transaction succeeds on one or more microservices but fails on others. Consistency of objects stored across data stores is enabled, especially in the case where one or more microservices fail or some other system fault occurs (e.g., failure of an API gateway) in performing a transaction with respect to their respective data layer. The techniques may be implemented in various ways, including a so-called "Always Strictly Consistent Microservice Coordination" as well as "Strictly Successful Eventually Consistent Multiple Microservice Coordination." Among other advantages, the always strictly consistent embodiment avoids fragility via the use of the pseudo IDs eliminating the requirement that the data API keep a database transaction open across API calls. Both of these solutions provide a low complexity solution to the human emotional dependency on the strict consistency of success but not failure. Each of these example methods will be discussed in turn.

According to one embodiment of the present disclosure, a method referred to as "Always Strictly Consistent Microservice Coordination" is described that guarantees immediate consistency for data stored across multiple microservices. With always strictly consistent microservice coordination, each data API associated with a microservice is configured to recognize a "no-commit" instruction, which may be embedded in a header of a data modification request, to not perform an actual commit, and instead return pseudo IDs for the modification request. Each pseudo ID may correspond to a foreign key or some other data store element. A first data API associated with a first microservice is then issued a data modification request (e.g., from an API gateway) using the no-commit instruction, which causes the first data API to return pseudo IDs associated with the modification request. The pseudo IDs are then provided to a second data API associated with a second microservice in a second data modification request that also includes a no-commit instruction. The first data modification request is then "replayed" to the first data API, this time omitting the no-commit instruction, which causes the first data API to perform the commit, but return real IDs. A map is then generated, mapping the pseudo IDs to the real IDs. The second data modification request is then replayed to the second data API, in which the pseudo IDs are replaced with the real IDs using the map.

As used herein, a "real ID" may refer to a data element that is generated from a committable modification request sent to a database. On the other hand, because requests with a no-commit instruction cannot modify the database, the data APIs handling those requests cannot return real IDs. In this instance, pseudo IDs are returned instead. After the script terminates normally and the API Gateway framework replays those calls (this time without the no-commit instruction), the pseudo IDs are replaced with real IDs in subsequent data API calls.

According to an alternative embodiment of the present disclosure, a method referred to as "Strictly Successful Eventually Consistent Multiple Microservice Coordination", data stored across microservices is guaranteed to be consistent eventually, i.e., after some period of time has elapsed. With strictly successful eventually consistent microservice coordination, a message broker is configured to provide a communication infrastructure for a plurality of microservices that may publish and subscribe to messages. Each data API associated with a respective microservice is then configured to upon receiving a data modification request, which may include a transaction ID, to send a before image message of the data to the message broker. The before image represents the data stored in an associated data store for the microservice prior to its modification. The data API then attempts to modify the data store. If the data API encounters an error in performing the modification, a failure message indicating the transaction ID may then be sent to the message broker instead of the after image of the data (a representation of the data after its modification). Each data API associated with a microservice may detect the receipt of a failure message associated with the same transaction ID from the message broker. Upon receipt of such a failure message, the data API may then attempt to modify the data store to unwind the transaction such that if an after image has been stored, it is replaced with the corresponding before image (the data prior to modification).

Always Strictly Consistent Multiple Microservice Coordination

Figure 1A:
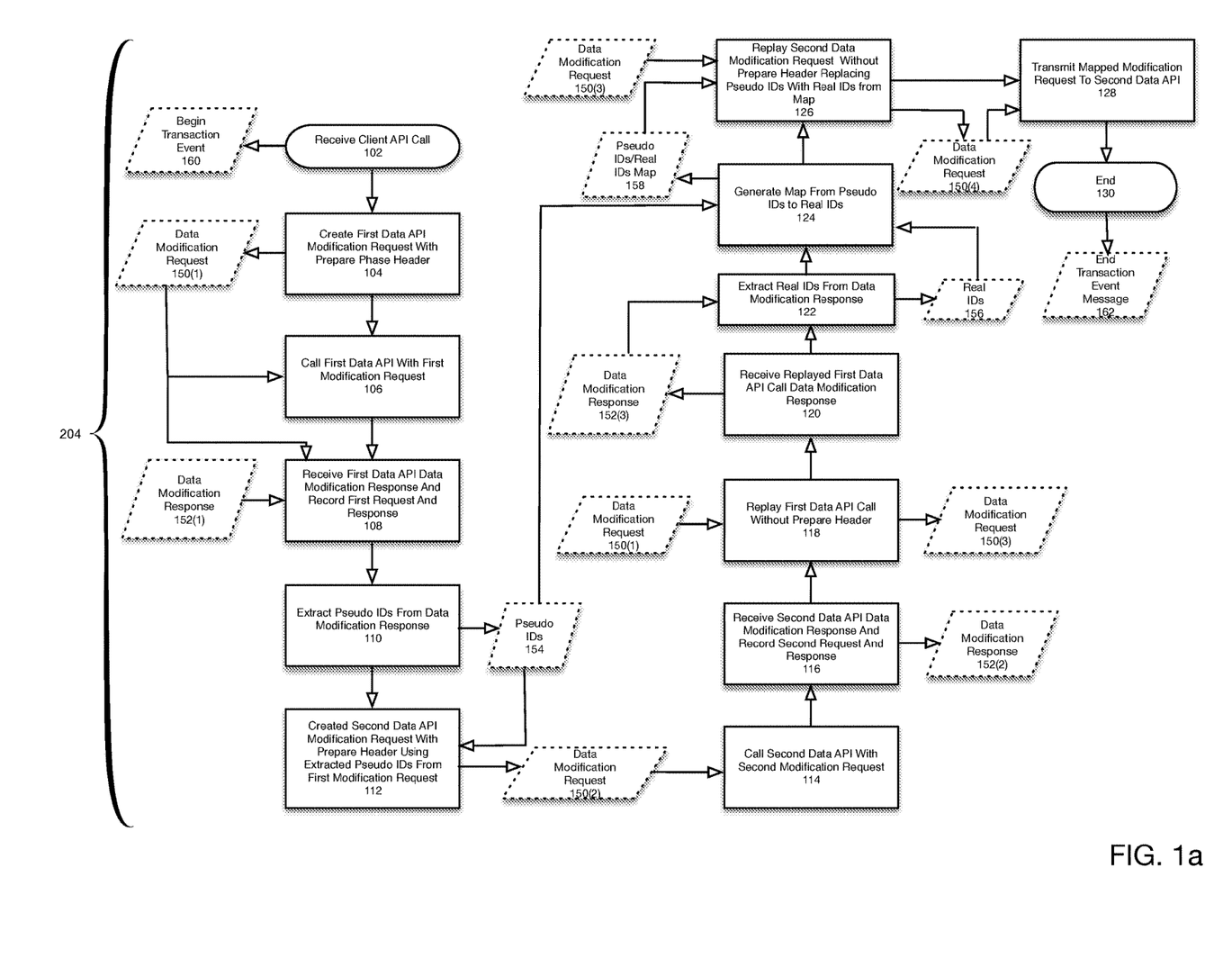
FIG. 1a is a flowchart depicting a process for achieving data consistency across multiple microservices using an always strictly consistent multiple microservice coordination scheme according to one embodiment of the present disclosure.

FIG. 1a is a flowchart depicting a process for achieving data consistency across multiple microservices using an always strictly consistent multiple microservice coordination scheme according to one embodiment of the present disclosure. According to embodiments described in the present disclosure, always strictly consistent multiple microservice coordination insures data consistency across two or more microservices immediately upon a modification request and does invoke any delay before consistency is achieved across multiple data stores associated with respective microservices. As discussed with respect to FIG. 2, the process shown in FIG. 1a may be performed by an API gateway with support by a data API associated with each microservice. That is, according to some embodiments of the present disclosure, and as described in more detail with respect to FIG. 1b, each data API associated with a microservice may perform various processes to support always strictly consistent multiple microservice coordination in coordination with the process shown in FIG. 1a and performed by an API gateway.

With respect to the initiation of the process shown in FIG. 1a, it is assumed that a user may have performed some action that requires a modification of data stored in a data store of at least two microservices. For example, it is typical that data may be stored in a distributed manner across multiple data stores, each data store associated with a respective microservice. Typically, a microservice may be associated with a set of tables of a database. However, changes to the data in one table stored on one data store (microservice) may impact data stored in another table on another data store (microservice) due to the foreign keys between tables. Thus, if a data modification is effected with respect to a first data store associated with a first microservice, the impact of that modification to the data stored in a second data store associated with a second microservice should be consistent The process depicted in FIG. 1a is an example only and assumes only a first and second microservice. However, it should be understood that the process depicted in FIG. 1a is easily extended to an arbitrary number of microservices and their associated data stores in which consistency between the data stored in those data stores is required.

Referring to FIG. 1a, the process is initiated in 102 whereupon a client API call requiring modification of data on at least two microservices is received. As used herein, the term "transaction" refers to a set or collection of modification requests instituted with respect to a plurality of data APIs, wherein each data API is associated with a respective microservice. As described below with respect to FIG. 2, according to one embodiment of the present disclosure, a transaction may be triggered upon a client performing some action, which causes a data modification request to be received at an API gateway. As shown in FIG. 1a, the API gateway may then generate a begin transaction event message 160 corresponding to the beginning of the transaction.

Based upon the beginning of a transaction event, in 104 a first data modification request including a prepare phase header is created 150(1). According to one embodiment of the present disclosure, first data modification request 150(1) may comprise, among other elements such as the prepare phase header, the actual data to be modified at the first microservice. As will be described below, a prepare phase header signifies to a data API associated with a respective microservice to prepare a data modification but not to commit it (i.e., it may comprise a no-commit instruction to a data API). As will be described below, each microservice may be associated with a respective data API that is capable of recognizing a prepare phase header or other information indicating a no-commit instruction and accordingly performing or not performing certain actions based upon the absence or existence of a prepare phase header. For example, as described in more detail below, upon detection of a prepare phase header, a data API may not perform a commit but instead may only perform only a data validation. Further, according to some embodiments of the present disclosure, upon receiving a prepare phase header, a data API may generate and prepare a data modification response using pseudo IDs for the associated data modification request rather than real IDs.

In 106, a method is called on a first data API associated with a first microservice to perform a data modification using first data modification request 150(1). In 108, first data modification response 152(1) provided for first data modification request 150(1) is received from the first data API. According to one embodiment of the present disclosure, because first data modification request 150(1) included a prepare phase header, the first data API automatically generates first data modification response 152(1) to include pseudo IDs 154 and returns data modification response 152(1). An example of a process performed by a data API to support the handling of a prepare phase header is described below with respect to FIG. 1b. In 110, the pseudo IDs 154 returned from the first data API are extracted from the first data modification response 152(1) and stored, for example, in a transaction log.

In 112, second data modification request 150(2) that also includes a prepare phase header is generated. Further, according to one embodiment of the present disclosure, the pseudo IDs 154 returned from the first data API are inserted into the prepare phase header of 150(2). In 114, a second data API associated with a second microservice is called using second data modification request 150(2). In 116, second data modification response 152(2) (from the second data API) based upon second data modification request 150(2) is received from the second data API. Second data modification request 150(2) and second data modification response 152(2) are then stored, in for example, a transaction log.

In 118, the first data API modification request 150(1) is replayed without the prepare phase header. As used herein, the term "replay" refers to submitting an identical modification request, but possibly with one or more parameters or headers modified or removed. According to one embodiment of the present disclosure, the replaying of modification request 150(1) is performed upon normal termination of a script handing the original request sent to the API. Thus, in this case, first data modification request 150(1) without the prepare phase header, which comprises a third data modification request 150(3), is submitted again to the first data API. In 120, third data modification response 152(3) (i.e., replayed response) to third data modification request 150(3) (replayed request) is received from the first data API. However, in this case, because no prepare phase header was utilized as part of the replayed modification request, instead of receiving pseudo IDs 154, real IDs 156 are received instead in third data modification response 152(3). In 122, real IDs 156 are extracted from third data modification response 152(3).

In 124, pseudo IDs/real IDs map 158 is generated relating pseudo IDs 154 to real IDs 156. In 126, third data modification request 150(3) is modified by replacing pseudo IDs 154 in 150(3) with real IDs 156 and without the prepare phase header to generate fourth data modification request 150(4), which is transmitted to the second data API. The process ends in 130, wherein end transaction event message 162 is generated.

Figure 1B:
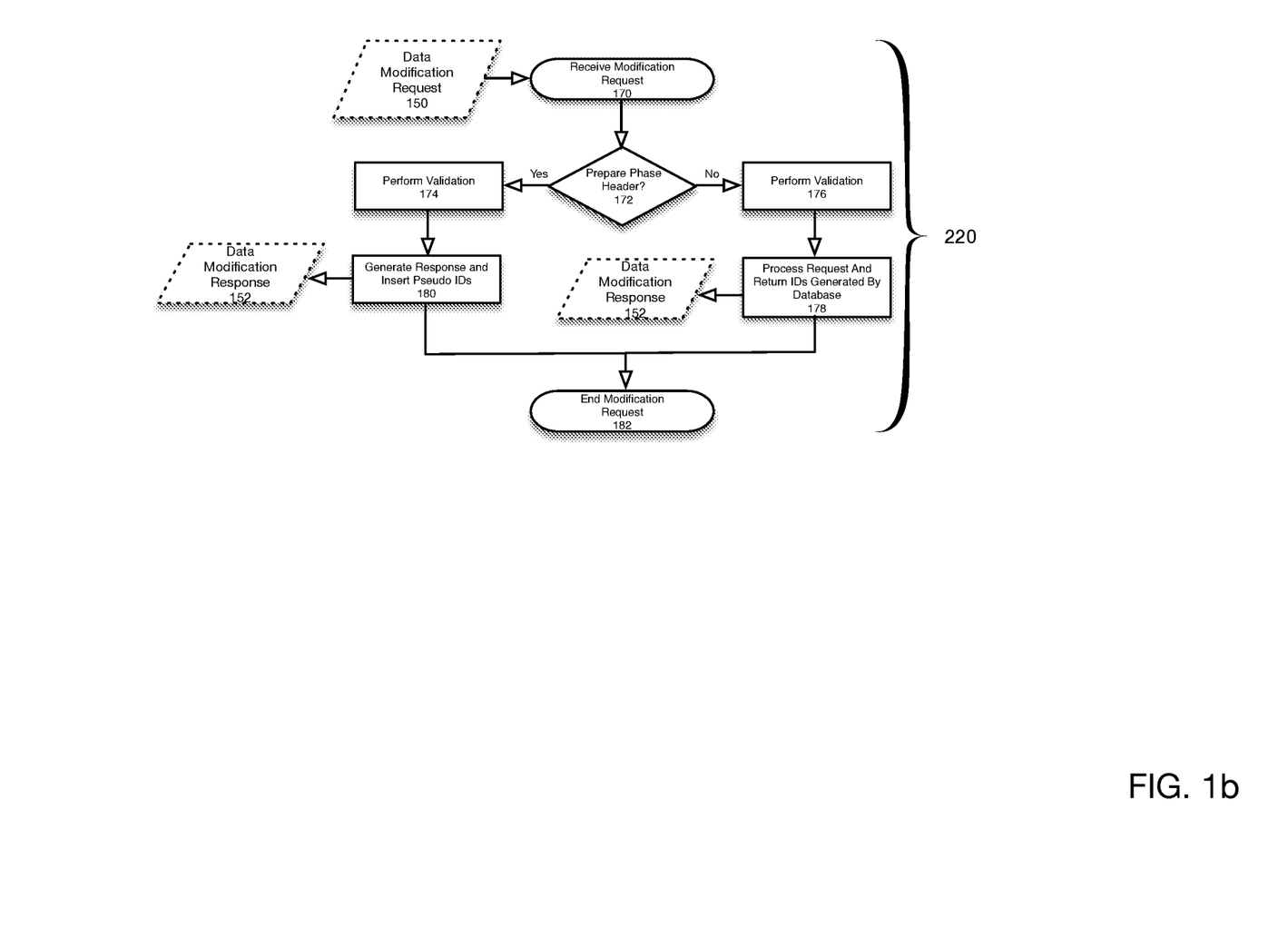
FIG. 1b shows a process performed by a data API in order to provide always strictly consistent multiple microservice coordination according to one embodiment of the present disclosure.

FIG. 1b shows a process performed by a data API in order to provide always strictly consistent multiple microservice coordination according to one embodiment of the present disclosure. Referring to FIG. 1b, in 170 modification data request 150 is received in 170 from API gateway 204. In 172, it is determined whether data modification request 150 includes a prepare phase header. If not (No branch of 172), in 176 validation is performed. Then, in 178, data modification request 150 is processed and any values returned by data layer/data store such as auto-increment primary keys on create are returned in data modification response 152 to API gateway 204. As part of 178, a commit to the underlying data store may be performed. The process then ends in 182.

If data modification request 150 does include a prepare phase header ('Yes' branch of 172), validation is performed in 174. Then, in 180 data modification response 152 is generated in which pseudo IDs 154 are inserted. Data modification response 152 is then returned to API gateway 204. The process then ends in 182. Note that if a prepare phase header is received as part of data modification request 150, no-commit is performed with respect to the underlying data store.

Figure 2:
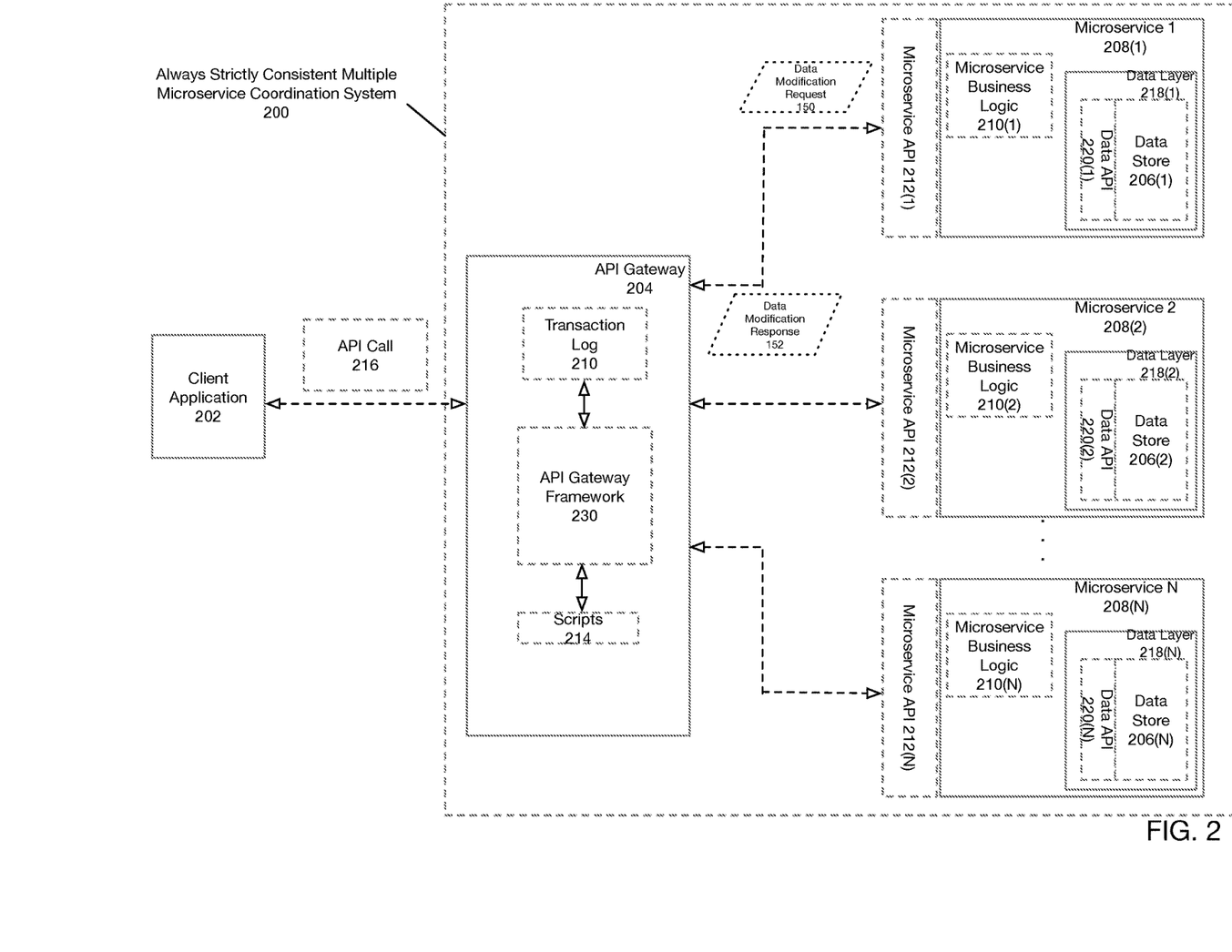
FIG. 2 is a block diagram of an API gateway and a number of microservices that may operate to provide always strictly consistent coordination across multiple data stores associated with each microservice according to one embodiment of the present disclosure.

FIG. 2 is a block diagram of an API gateway and a number of microservices that may operate to provide always strictly consistent coordination across multiple data stores associated with each microservice according to one embodiment of the present disclosure. As shown in FIG. 2, client application 202 may interact with API gateway 204 to request various services via API call 216. API gateway 204 may, for example, utilize the RESTful protocol. However, this is merely one example and, in general, API gateway 204 may provide an API implemented using any number of protocols/ technologies.

In general, client application 202 may be any application that is capable of interacting with API gateway 204. Thus, client application 202 may run, for example, on a desktop computer, a mobile device such as a Smartphone, a server. etc. Upon receiving API call 216 from client application 202, API gateway 204 may in turn interact with one or more microservices 208(1)-208(N) in order to service API call 216 generated by client application 202.

As shown in FIG. 2, each microservice 208(1)-208(N) may further comprises a respective microservice API 212 (1)-212(N), microservice business logic module 210(1)-210 (N) and respective data layer 218(1)-218(N). Among other things, each microservice API 212(1)-212(N) may comprise logic/instructions for handling data modification requests (e.g., 150) received from API gateway 204. For example, according to one embodiment of the present disclosure, upon receiving data modification request 150, microservice API 212(1) may invoke business logic 210(1) and forward data modification request 150 to data API 220(1) in data layer 218(1). Data API 220(1) may then perform operations with respect to data store 206(1) such as storing or retrieving data (e.g., generating data modification response 152) which may be returned via data API 220(1) and then via microservice API 212(1) to API gateway 204.

Data layers 218(1)-218(N) may provide services for persisting and retrieving data for each respective microservice 208(1)-208(N). To this end, each of data layer 218(1)-218 (N) may further comprise a respective data API 220(1)-220 (N) and data store 206(1)-206(N).

As described above with respect to FIG. 1b, according to one embodiment of the present disclosure, each data API 220(1)-220(N) may be adapted to detect a prepare phase header embedded in received data modification request 150. If a data API 220(1)-220(N) detects a prepare phase header in a received data modification request 150, upon execution of data modification request 150, it does not perform any commits to respective data store 206(1)-206(N). Further, when generating data modification response 152, data API 220(1)-220(N) may generate a pseudo ID 154 rather than a real ID 156 in all places where a respective data store 206(1)-206(N) generated value was expected.

API gateway 204 may further comprise API gateway framework 230, scripts 214 and transaction log 210. According to some embodiments of the present disclosure, API gateway 204 may perform various processes for insuring always strictly consistent multiple microservice coordination across associated data stores. API gateway 204 may run scripts 214 to perform various processes such as performing always strictly consistent microservice coordination as depicted in FIG. 1a. Scripts 214 may make calls into API gateway framework 230, which may provide services to support various actions such as making API calls to microservices 208(1)208(N).

Further, as will be described below, in order to provide such coordination, according to one embodiment, each microservice 208(1)-208(N) may be adapted to support particular business logic, and API calls, etc. In particular, according to one embodiment of the present disclosure as discussed above with respect to FIG. 1b, each respective data API 220(1)-220(M) may be adapted to recognized a prepare phase header (no-commit instruction) and perform various functions upon such detection of a prepare phase header such as generating pseudo IDs 154 in response to a data modification request 150 rather than providing real IDs 156, which would be generated absent a prepare phase header.

An operation of one microservice 208(1) is shown explicitly in FIG. 2, namely the receipt of data modification request 150 and generation of data modification response 152. Although not shown for each of the other microservices 208(2)-208(N), it is understood that each of those microservices performs similar operations. Thus, for purposes of this discussion, the operation of microservice 208(1) will be described with the understanding that microservices 208(2)-208(N) may perform similar operations.

An example of an operation of always strictly consistent multiple microservice coordination in the context of the system shown in FIG. 2 will now be described. For purposes of this example in the context of FIG. 2, FIG. 2 shows data modification request 150 and data modification response 152 exchanged between API gateway 204 and microservice 1 (208(1)). It will be understood that similar data modification requests and data modification responses will be exchanged between the other microservices 208(2)-208(N) and API gateway 204 although they are not explicitly shown in FIG. 2.

According to this example, client application 202 makes API call 216 to API Gateway 204. API Gateway 204 comprising framework 230 routes the call 216 to an associated script 214 configured to handle that specific call. According to one embodiment of the present disclosure, API gateway 230 performs this process by loading, interpreting, and executing script 214 for each call API call 216. Script 214 may then make a first call to an underlying data API 220(1) by preparing data modification request 150. API framework 230 may then intercept this request 150 transforming it into a no-commit instruction by including a prepare phase header.

Data API 212(1) receives and inspects data modification request 150, further detecting that it includes a no-commit instruction. Thereby, data API 212(1) only validates data modification request 150 and does not perform a commit. Instead of calling data store 206(1) to obtain real ids, data API 220(1) may then return data modification response 152 using pseudo IDs. Before passing this response back to script 214, API gateway framework 230 may extract the pseudo IDs from data modification response 152 and record them for later.

Based on data modification response 152, script 214 may then prepares a second data modification request 150 to the second data API 212(2). Script 214 is not cognizant of any difference between real and pseudo IDs but uses the IDs from the first data modification response 152 as a part of the second request 150. API gateway framework 230 may then intercept the second data modification request 150 transforming it into a no-commit instruction by including a prepare phase header. Second data API 212(2) receives and inspects the second data modification request 150, and upon recognizing that it includes a no-commit instruction it only validates the request and does not perform a commit. Instead of calling data store 206(2) to obtain real IDs, data API 212(2) may return a response using pseudo IDs.

Before passing this data modification response 152 back to script 214, API gateway framework 230 may then extract the pseudo IDs from the response 152 and record them for later use. Script 214 may then terminate normally signaling a successful coordinated microservice operation. API gateway framework 230 may then automatically (based upon script 214 terminating normally) replay the first data modification request 150 to the first data API 220(1), this time without a prepare phase header. First data API 220(1) recognizing no prepare phase header commits the changes and returns a data modification response 152 with real IDs.

Upon receiving this response 152, API gateway framework 230 may then extract the real IDs from data modification response 152, which it then uses to map pseudo IDs to real IDs. API gateway framework 230 may then replay the data modification request to the second data API 212(2) replacing pseudo IDs with real IDs. Second data API 212(2) recognizing that no prepare phase header exists in the request 150, commits the changes and returns a response with real IDs. API gateway framework 230 may then extract the real IDs from the data modification response 152 which it then uses to map pseudo IDs to real IDs needed in the response to the client application 202.

According to one embodiment of the present disclosure, not only does API gateway framework 230 record requests and responses to/from data APIs 220(1)-220(N) for the purposes of replaying them later and mapping pseudo IDs to real IDs, in addition, API gateway framework 230 may also record a data modification response 152 that script 214 intended to be returned to the client application 202 in order to perform the same pseudo ID to real ID mapping before actually returning the response to the client application 202.

An example always strictly consistent multiple microservice coordination operation as shown in FIGS. 1a-1b and 2, that is successful will now be described. According to this example, an API Gateway 204 and data API 220 for creating widgets is provided with the following business rules:

A widget cannot exist without a widget holder.
There are no large brown widgets.
Client application 202 may then call API gateway 204 with the following request:
curl -d'{"name":"test","color":"red","size":"large"}' http://gateway.sample.com/widgets An example script 214 executed by API gateway 204 upon receiving this request is:

```
if (request.holder_id == null) {
    var createHolderRequest = { "name":"holder for " + request.name };
    var response = dataApi.createHolder(createHolderRequest);
    request.holder_id = response.holder_id;
}
return dataApi.createWidget(request);
```

An example of a first data modification request 150(1) performed by API gateway 204 to a first data API 220(1) is:
curl -H 'prepare: true' -d'{"name":"holder for test"}' http://data.sample.com/holders Data API 220(1) may return the following data modification response 152:
{"holder_id":1,"name":"holder for test"}

An example second data modification request 150(2) generated by API gateway 204 and received by a second data API 220(2) is:
curl -H 'prepare: true' -d '{"holder_id":1,"name":"test","color":"red","size":"large"}' http://data.sample.com/widgets Second data API 220(2) may then return the data modification response 152:
{"widget_id":2,"holder_id":1,"name":"test","color":"red","size":"large"}

Script 214 is now completed and API gateway framework 230 may then replay the requests as follows to the first data API 220:

curl -d '{"name":"holder for test"}' http://data.sample.com/holders

The first data API 220 may then provide as a data modification response 152:
{"holder_id":21,"name":"holder for test"}

API gateway 204 now recognizes that pseudo id 1 (154)= real id 21 (156) and therefore it may perform the appropriate substitution as follows:
curl'{"holder_id":21, "name": "test", "color": "red", "size": "large"}' http://data.sample.com/widgets Client application 202 may then receive the following data modification response 152:
{"widget_id":47,"holder_id":21,"name":"test","color":"red","size":"large"}

An example always strictly consistent multiple microservice coordination operation that fails will now be described. Client application 202 may then call API gateway 204 with the following request:

```
curl -d '{"name": "test", "color":"brown",
"size":"large"}' http://gateway.sample.com/widgets
curl -H 'prepare: true' -d '{"name":"holder for test"}'
http://data.sample.com/holders
{"holder_id":1,"name":"holder for test"}
curl -H 'prepare: true' -d
'{"holder_id":1,"name":"test","color":"brown","size":"large"}'
http://data.sample.com/widgets
```

This time, the data API returns an error response which is returned to the original caller of the gateway:
HTTP status code: 400 cannot create large brown widgets
Note that the second widget holder was never actually created.

Strictly Successful Eventually Consistent Multiple Microservice Coordination

Figure 3:
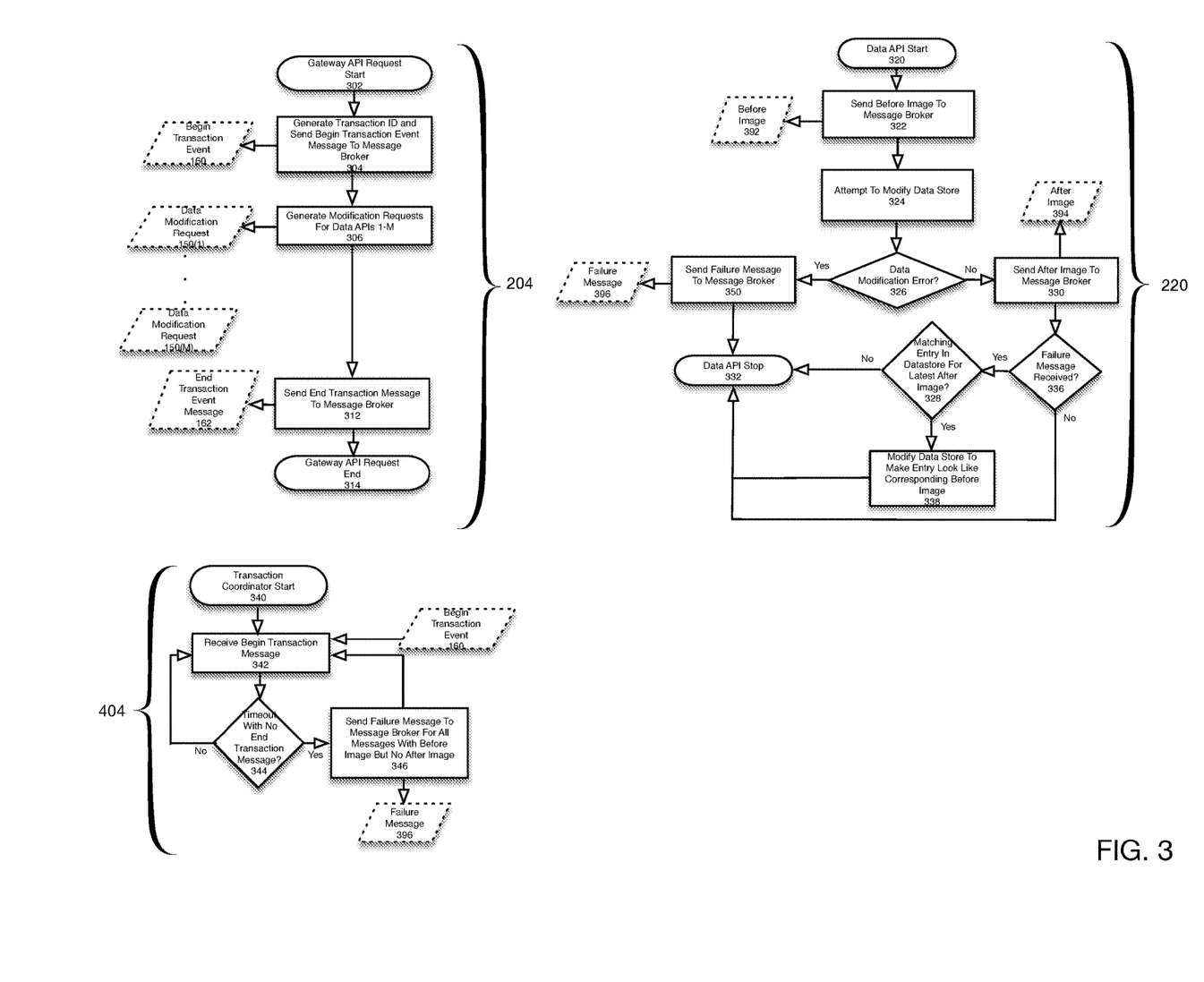
FIG. 3 shows respective flowcharts for a gateway API, data API and a transaction coordinator to effectuate the providing of strictly successful eventually consistent multiple microservice coordination according to one embodiment of the present disclosure.

FIG. 3 shows respective flowcharts for a gateway API, data API and a transaction coordinator to effectuate the providing of strictly successful eventually consistent multiple microservice coordination according to one embodiment of the present disclosure. In comparison to the process shown in FIG. 1, consistency amongst the data layers 218(1)-218(N) of respective microservices 208(1)-208(N) is eventually consistent rather than always consistent meaning that the consistency between data stores of the multiple microservices 208(1)-208(N) is guaranteed after some period of time (eventually), but may not be consistent immediately. In contrast to the method/technique shown in FIG. 1, according to some embodiments, the process shown in FIG. 3 may leverage a message broker as will be discussed with respect to FIG. 4. Briefly, for purposes of the present discussion, a message broker may comprise a centralized entity that receives, routes and processes messages from various entities. As will be discussed in more detail with respect to FIG. 4, entities may subscribe to particular message types or channels and thereby receive message from the message broker meeting the subscription criteria.

Figure 4:
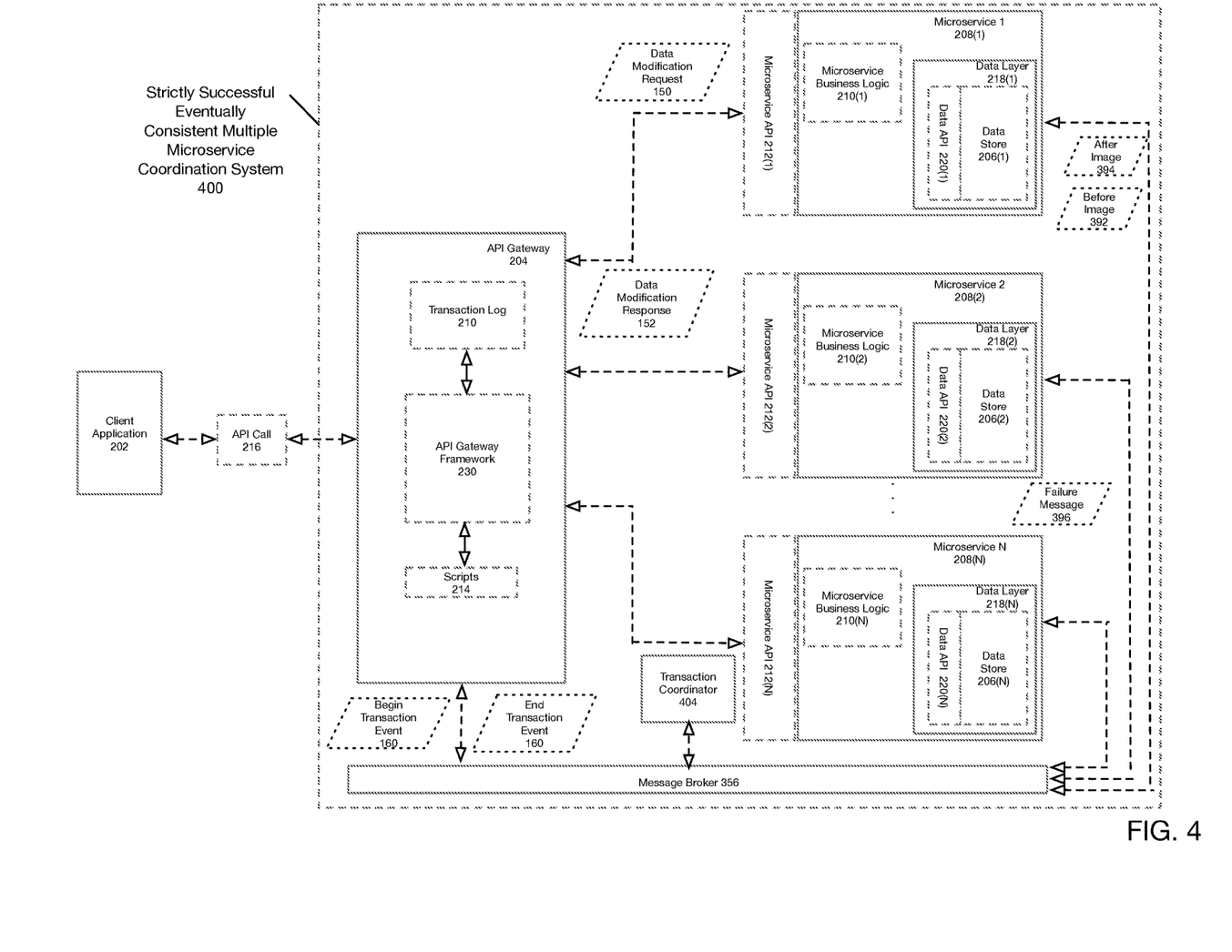
FIG. 4 shows a structure of a strictly successful eventually consistent multiple microservice coordination system according to one embodiment of the present disclosure.

Further, although FIG. 3 only shows the operation of a single data API 220, it is assumed that the process performed by data API 220 shown in FIG. 3 is performed by each data API 220(1)-220(N) as shown in FIG. 4 below, which shows an example block diagram of a system for providing strictly successful eventually consistent multiple microservice coordination.

According to one embodiment of the present disclosure, API gateway 204 may initiate a process in 302 upon receipt of an API call 216 from client application 202. According to one embodiment of the present disclosure, API gateway 204 may generate a transaction ID that identifies modifications that are to be performed by some subset of microservices 208(1)-208(N). In particular, according to one embodiment of the present disclosure, a single transaction will typically involve a set of data modification requests 150(1)-150(M) to a respective set of data APIs 220(1)-220(M).

Referring to FIG. 3, in 304, API gateway 204 generates and submits a begin transaction event message 160 to the message broker. In generating such begin transaction event message 160, according to one embodiment of the present disclosure, API gateway 204 may generate a transaction ID, which is included as part of begin transaction event message 160.

In 306, API gateway 204 initiates modification requests for each data API 220(1)-220(M) associated with the transaction. In particular, according to one embodiment of the present disclosure, API gateway 204 may call each respective data API 220(1)-220(M) with a data modification request 150 pertaining to the data to be modified by that respective data API 220. According to one embodiment of the present disclosure, each data modification request 150 (1)-150(M) may include the transaction ID generated in 304 as well as the data that is to be stored (i.e., modified) in data store 206. In 312, API gateway 204 sends end transaction event message 162 to the message broker. The process ends in 314.

As previously described, API gateway 204 may generate a respective data modification request 150(1)-150(M) for each data API 220(1)-220(M) associated with the transaction. According to one embodiment, upon receiving a modification request, each data API 220(1)-220(M) upon receiving respective data modification request 150(1)-150(M) generated in 306 may attempt to perform a modification of respective data store 206(1)-206(M).

FIG. 3 shows an example process performed by a representative data API 220, but it will be understood that the process will be performed by each data API 220(1)-220(M) involved in the transaction. Referring to FIG. 3, the process is initiated in 320. As previously discussed, it is assumed for purposes of this example that a particular data modification request 150 pertains to the modification (i.e., replacement) of one or more data values/elements stored in data store 206 associated with microservice 208. This data may be stored in a database table, for example. For purposes of this discussion, the current value or state of the data stored in data store 206 prior to modification is referred to as a "before image" while the value or state of the data after a modification by data API 220 is referred as the "after image". In 322, data API 220 sends before image message 392 to the message broker. Before image message 392 may further comprise the data prior to modification (i.e., the before image).

In 324, data API 220 attempts to modify data store 206 with the new data. In 326, data API 220(1) determines whether the modification attempt of data store 206 was successful. If so ('Yes' branch of 326), in 328 data API 220 sends failure message 396 to the message broker and the process ends in 332.

If not ('No' branch of 326), in 330, data API 220 sends after image message 394 to the message broker. In 336, data API 220 waits to detect receipt of a failure message from the message broker that may have been generated by a different data API 220 involved in the transaction. If no such failure message is detected ('No' branch of 336), the process ends in 332.

If, on the other hand, a failure message is received from the message broker pertaining to another data API 220 ('Yes' branch of 336), in 328, it is determined whether the after image is contained in the failure message. If so ('Yes' branch of 328), in 338 data API 220 modifies the data store 206 to replace the before image message with the after image message. The process then ends in 332.

Although FIG. 3 shows a sequential process in which a check is performed for a failure message subsequent to an attempt to perform a data modification, according to some embodiments, the data modification actions and the check for receipt of a failure message are performed in different threads. In this way, these processes may operate concurrently and/or in parallel.

As shown in FIG. 3, transaction coordination 404 may perform a process to handle scenarios in which a gateway API failure occurs, for example where API gateway 204 crashes. According to embodiments of the present disclosure, the message broker may track all before image messages 392 and after image messages 394 received from the message broker and further track cases in which a corresponding after image message 394 was not received for a given before image message 392. As shown in FIG. 3, in 340 a transaction coordinator process may be initiated. In 342, the transaction coordinator may receive a begin transaction event message 160 from the message broker. In 344, the transaction coordinator may then wait for an end transaction event message 162 from the message broker. If no end transaction event message 162 is received after a configurable period of time, the transaction coordinator will send a failure message is sent to the message broker for that transaction ID. This will cause the respective data APIs 220 to modify the respective data store 206 to the before image.

FIG. 4 shows a structure of a strictly successful eventually consistent multiple microservice coordination system according to one embodiment of the present disclosure. As shown in FIG. 4, strictly successful eventually consistent multiple microservice coordination system 400 may further comprise API gateway 204, microservices 208(1)-208(N), message broker 356 and transaction coordinator 404. As shown in FIG. 4, in comparison to always strictly consistent microservice coordination system 200 shown in FIG. 2, message broker 356 and transaction coordinator 404 are introduced. Message broker may be any type of message bus where the ordering of messages is preserved and no messages get lost. The operation of API gateway 204, microservice APIs 212(1)-212(N), client application and transaction coordinator 404 have already been described with reference to FIG. 3.

Referring to FIG. 4, client application 202 may generate API call 216 that is received at API gateway 204. API gateway 204 may then perform various data modification requests 150 with respect to microservices 208(1)-208(N) by calling respective microservice APIs 212(1)-212(N) as well as receive various data modification responses 152 from microservices 208(1)-208(N) via respective microservice APIs 212(1)-212(N).

According to some embodiments of the present disclosure, strictly successful eventually consistent multiple microservice coordination system 400 may perform its operations with respect to the processes shown in FIG. 3 on API gateway 204, data APIs 220(1)-220(N) and transaction coordinator 404. Message broker 356 may serve as a conduit for the passage of message between these entities. In particular, with respect to the processes shown in FIG. 3, scripts 214 in API gateway 204 may perform an API gateway process to support strictly successful eventually consistent multiple microservice coordination as shown in FIG. 3 making use of API gateway framework 230 to support various services and logging results in transaction log.

Similarly, data APIs 220(1)-220(2) may perform the process shown in FIG. 3 to support strictly successful eventually consistent multiple microservice coordination as shown in FIG. 3.

FIG. 4 also shows some example message passing between microservices 208(1)-208(N) and message broker 356. Thus, as shown as an example, microservice 208(1) may pass before image message 392 and after image message 394 via data API 220(1) to message broker 356. Failure message 396 may be generated by microservice 208(2) and passed to message broker 356 via data API 220(2).

Figure 5A:
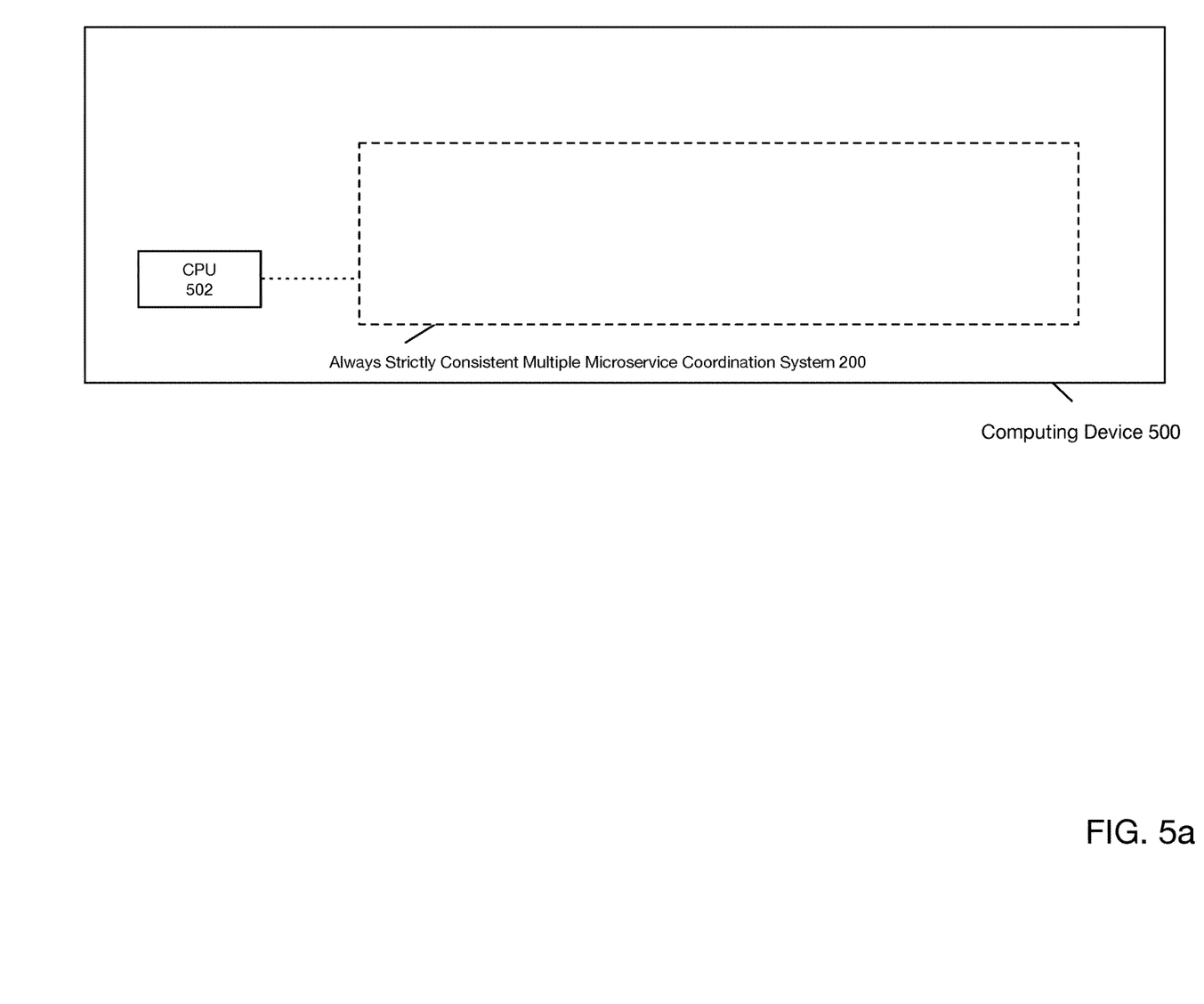
FIG. 5a illustrates an example computing system that executes an always strictly consistent multiple microservice coordination system according to one embodiment of the present disclosure.

FIG. 5a illustrates an example computing system that executes an always strictly consistent multiple microservice coordination system according to one embodiment of the present disclosure. As depicted in FIG. 5a, computing device 500 may include CPU 502 that executes one or more processes to perform always strictly consistent multiple microservice coordination system 200. In particular, CPU 502 may be further configured via programmatic instructions to execute always strictly consistent multiple microservice coordination system 200 (as variously described herein). Other componentry and modules typical of a typical computing system, such as, for example a co-processor, a processing core, a graphics processing unit, a mouse, a touch pad, a touch screen, display, etc., are not shown but will be readily apparent. Numerous computing environment variations will be apparent in light of this disclosure. Computing device 500 may be any stand-alone computing platform, such as a desk top or work station computer, laptop computer, tablet computer, smart phone or personal digital assistant, game console, set-top box, or other suitable computing platform.

According to an alternative embodiment, CPU 502 may execute either always strictly consistent multiple microservice coordination system 200 shown in FIGS. 1a-1b and 202 or strictly successful eventually consistent multiple microservice coordination system 400 shown in FIGS. 3-4.

Figure 5B:
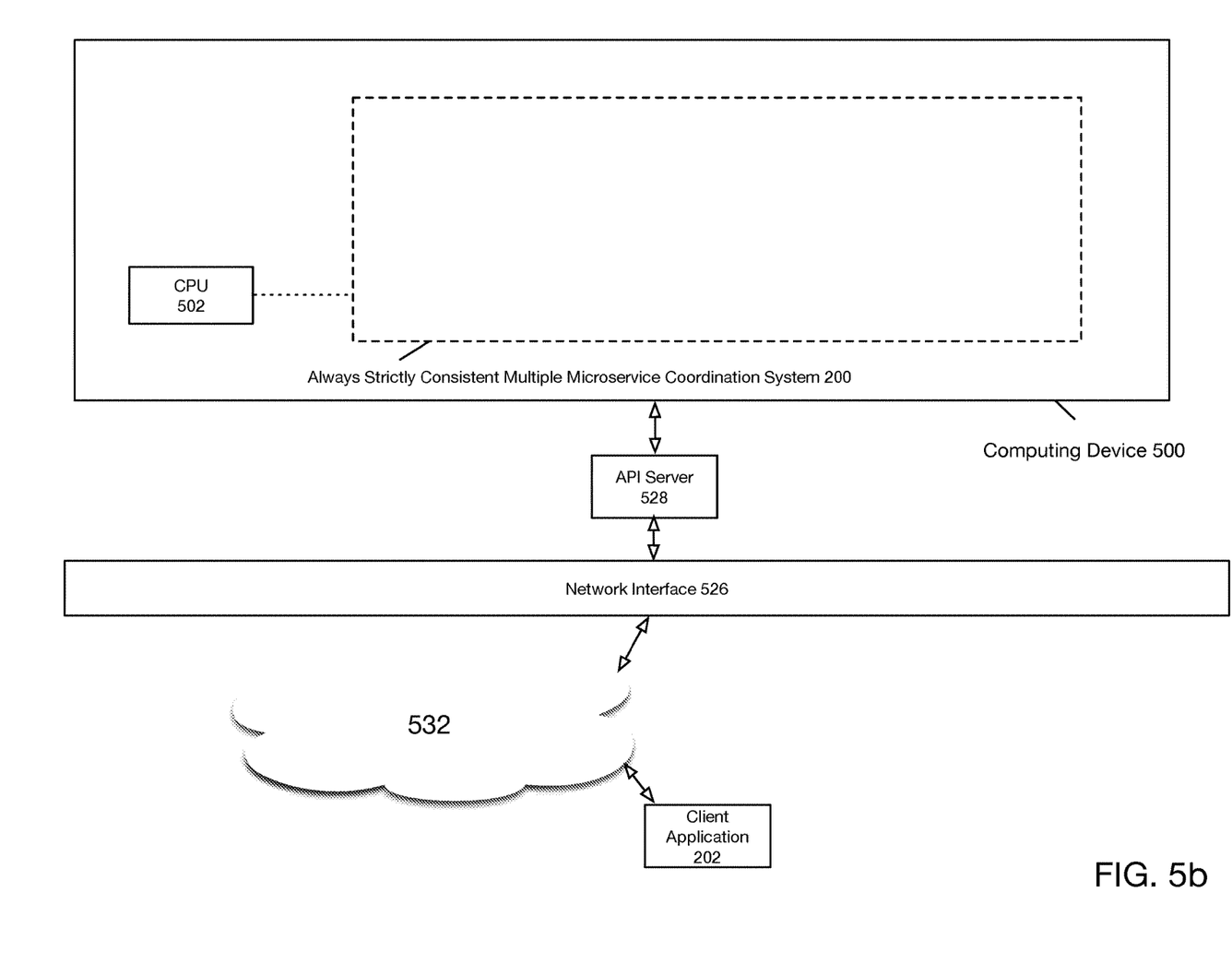
FIG. 5b illustrates an example integration of an always strictly consistent multiple microservice coordination system into a network environment according to one embodiment of the present disclosure.

FIG. 5b illustrates an example integration of an always strictly consistent multiple microservice coordination system into a network environment according to one embodiment of the present disclosure. As depicted in FIG. 5b, computing device 500 may be collocated in a cloud environment, data center, local area network ("LAN") etc. Computing device 500 shown in FIG. 5b is structured identically to the example embodiment described with respect to FIG. 5a. As shown in FIG. 5b, client application 202 may interact with computing device 500 via network 532. In particular, client application 202 may make requests and receive responses via API calls 216 received at API server 528, which are transmitted via network 532 and network interface 526.

It will be understood that network 532 may comprise any type of public or private network including the Internet or LAN. It will be further readily understood that network 532 may comprise any type of public and/or private network including the Internet, LANs, WAN, or some combination of such networks. In this example case, computing device 500 is a server computer, and client application 202 may be any typical personal computing platform As will be further appreciated, computing device 500, whether the one shown in FIG. 5a or 5b, includes and/or otherwise has access to one or more non-transitory computer-readable media or storage devices having encoded thereon one or more computer-executable instructions or software for implementing techniques as variously described in this disclosure. The storage devices may include any number of durable storage devices (e.g., any electronic, optical, and/or magnetic storage device, including RAM, ROM, Flash, USB drive, on-board CPU cache, hard-drive, server storage, magnetic tape, CD-ROM, or other physical computer readable storage media, for storing data and computer-readable instructions and/or software that implement various embodiments provided herein. Any combination of memories can be used, and the various storage components may be located in a single computing device or distributed across multiple computing devices. In addition, and as previously explained, the one or more storage devices may be provided separately or remotely from the one or more computing devices. Numerous configurations are possible.

In some example embodiments of the present disclosure, the various functional modules described herein and specifically training and/or testing of network 340, may be implemented in software, such as a set of instructions (e.g., HTML, XML, C, C++, object-oriented C, JavaScript, Java, BASIC, etc.) encoded on any non-transitory computer readable medium or computer program product (e.g., hard drive, server, disc, or other suitable non-transitory memory or set of memories), that when executed by one or more processors, cause the various creator recommendation methodologies provided herein to be carried out.

In still other embodiments, the techniques provided herein are implemented using software-based engines. In such embodiments, an engine is a functional unit including one or more processors programmed or otherwise configured with instructions encoding a creator recommendation process as variously provided herein. In this way, a software-based engine is a functional circuit.

In still other embodiments, the techniques provided herein are implemented with hardware circuits, such as gate level logic (FPGA) or a purpose-built semiconductor (e.g., application specific integrated circuit, or ASIC). Still other embodiments are implemented with a microcontroller having a processor, a number of input/output ports for receiving and outputting data, and a number of embedded routines by the processor for carrying out the functionality provided herein. In a more general sense, any suitable combination of hardware, software, and firmware can be used, as will be apparent. As used herein, a circuit is one or more physical components and is functional to carry out a task. For instance, a circuit may be one or more processors programmed or otherwise configured with a software module, or a logic-based hardware circuit that provides a set of outputs in response to a certain set of input stimuli. Numerous configurations will be apparent.

The foregoing description of example embodiments of the disclosure has been presented for the purposes of illustration and description. It is not intended to be exhaustive or to limit the disclosure to the precise forms disclosed. Many modifications and variations are possible in light of this disclosure. It is intended that the scope of the disclosure be limited not by this detailed description, but rather by the claims appended hereto.

Further Example Embodiments

The following examples pertain to further embodiments, from which numerous permutations and configurations will be apparent.

Example 1 is a method for performing always strictly consistent modification of data in a plurality of data stores, the method comprising calling a first data API with a first data modification request, said first data modification request including a first no-commit instruction, receiving a first data modification response from said first data API, said first data modification response including a pseudo-identifier, calling a second data API with a second data modification request including said pseudo-identifier, wherein said second data modification request includes a second no-commit instruction, calling said first data API with a third data modification request, wherein said third modification request is a replay of said first data modification request, receiving a third data modification response from said first data API, said third data modification response including a real identifier associated with said pseudo-identifier, and, calling said second data API with a fourth data modification request, wherein said fourth data modification request is generated by replacing said pseudo-identifier with said associated real identifier such that data modified by said second data API is always strictly consistent with data modified by said first data API.

Example 2 is the method of Example 1, wherein said fourth modification request is a replay of said second data modification request.

Example 3 is the method of Example 1, wherein said third data modification request does not include a no-commit instruction.

Example 4 is the method of Example 1, wherein said fourth data modification request does not include a no-commit instruction.

Example 5 is the method of Example 1, wherein each of said first and second no-commit instructions includes information instructing a respective one of said first and second data APIs to perform a data validation and not to perform a commit.

Example 6 is the method of Example 1, wherein said first no-commit instruction further includes information instructing said first data API to generate and return said pseudo identifier.

Example 7 is the method of Example 1, wherein a map structure is used to associate said pseudo-identifier with said real identifier.

Example 8 is the method of Example 1, wherein said real identifier is a foreign key.

Example 9 is a method for performing eventually consistent modification of data across a plurality of communicatively coupled microservices, wherein upon receiving a request to perform a modification of data, the method comprises transmitting, by one or more of said microservices, before image information to at least one other microservice, said before image information representing target data stored in a data store associated with the corresponding microservice prior to modification of said target data, attempting, by said one or more of said microservices, to perform a modification of said target data, if an error is encountered in performing modification of said target data, transmitting, by said one or more of said microservices, failure information to at least one other microservice, if an error is not encountered in performing modification of said target data, transmitting, by said one or more of said microservices, after image information to at least one other microservice, said after image information indicative of an after image representing said target data after modification of said target data, and, upon detecting a failure message, reverting, by said one or more of said microservices, said after image of said target data to said before image of said target data.

Example 10 is the method of Example 9, wherein said plurality of communicatively coupled microservices communicate by publishing and subscribing to messages distributed by a message broker.

Example 11 is the method of Example 10, wherein said before image information, said after image information and said failure information comprise messages published to said message broker.

Example 12 is the method of Example 11, further comprising: upon determining that an after image message has not been generated for a corresponding before image message, transmitting, by said one or more of said microservices, a failure message.

Example 13 is the method of Example 9, wherein a begin transaction event message is transmitted at a beginning of a transaction involving said plurality of microservices.

Example 14 is the method of Example 13, wherein an end transaction event is transmitted at an end of a transaction involving said plurality of microservices.

Example 15 is a computer program product including one or more non-transitory machine-readable mediums encoded with instructions that when executed by one or more processors cause a process to be carried out for always strictly consistent modification of data in a plurality of data stores, the process comprising calling a first data API with a first data modification request, wherein said first data modification request includes a first no-commit instruction, receiving a first data modification response from said first data API, wherein said first data modification response includes a pseudo-identifier, calling a second data API with a second modification request including said pseudo-identifier, wherein said second data modification request includes a second no-commit instruction, receiving a second data modification response from said second data API, calling said first data API with a third data modification request, wherein said third data modification request is a replay of said first data modification request but without the first no-commit instruction, receiving a third data modification response from said first data API, wherein said third data modification response includes a real identifier associated with said pseudo-identifier, and, calling said second data API with a fourth data modification request, wherein said fourth data modification request is a replay of said second data modification request but without the second no-commit instruction, and wherein said fourth data modification request is generated by replacing said pseudo-identifier with said associated real identifier such that data modified by said second data API is always strictly consistent with data modified by said first data API.

Example 16 is the computer program product of Example 15, wherein each of said first and second no-commit instructions includes information instructing a respective one of said first and second data APIs to perform a data validation and not to perform a commit.

Example 17 is the computer program product of Example 16, wherein said first no-commit instruction further includes information instructing said first data API to generate and return said pseudo identifier.

Example 18 is the computer program product of Example 15, wherein a map structure is used to associate said pseudo-identifier with said real identifier.

Example 19 is the computer program product of Example 15, wherein said real identifier is a foreign key.

Example 20 is the computer program product of Example 15, wherein each of said first and second no-commit instructions includes a prepare phase header.

What is claimed is:
1. A method for performing always strictly consistent modification of data in a plurality of data stores, the method comprising:

calling a first data API with a first data modification request, said first data modification request including a first no-commit instruction;

receiving a first data modification response from said first data API, said first data modification response including a pseudo-identifier;

calling a second data API with a second data modification request including said pseudo-identifier, wherein said second data modification request includes a second no-commit instruction;

calling said first data API with a third data modification request, wherein said third modification request is a replay of said first data modification request;

receiving a third data modification response from said first data API, said third data modification response including a real identifier associated with said pseudo-identifier; and, calling said second data API with a fourth data modification request, wherein said fourth data modification request is generated by replacing said pseudo-identifier with said associated real identifier such that data modified by said second data API is always strictly consistent with data modified by said first data API.

2. The method according to claim 1, wherein said fourth modification request is a replay of said second data modification request.

3. The method according to claim 1, wherein said third data modification request does not include a no-commit instruction.

4. The method according to claim 1, wherein said fourth data modification request does not include a no-commit instruction.

5. The method according to claim 1, wherein each of said first and second no-commit instructions includes information instructing a respective one of said first and second data APIs to perform a data validation and not to perform a commit.

6. The method according to claim 1, wherein said first no-commit instruction further includes information instructing said first data API to generate and return said pseudo identifier.

7. The method according to claim 1, wherein a map structure is used to associate said pseudo-identifier with said real identifier.

8. The method according to claim 1, wherein said real identifier is a foreign key.

9. A method for performing eventually consistent modification of data across a plurality of communicatively coupled microservices, wherein upon receiving a request to perform a modification of data, the method comprises:

transmitting, by one or more of said microservices, before image information to at least one other microservice, said before image information representing target data stored in a data store associated with the corresponding microservice prior to modification of said target data;

attempting, by said one or more of said microservices, to perform a modification of said target data;

if an error is encountered in performing modification of said target data, transmitting, by said one or more of said microservices, failure information to at least one other microservice;

if an error is not encountered in performing modification of said target data, transmitting, by said one or more of said microservices, after image information to at least one other microservice, said after image information indicative of an after image representing said target data after modification of said target data; and, upon detecting a failure message, reverting, by said one or more of said microservices, said after image of said target data to said before image of said target data.

10. The method according to claim 9, wherein said plurality of communicatively coupled microservices communicate by publishing and subscribing to messages distributed by a message broker.

11. The method according to claim 10, wherein said before image information, said after image information and said failure information comprise messages published to said message broker.

12. The method according to claim 11, further comprising: upon determining that an after image message has not been generated for a corresponding before image message, transmitting, by said one or more of said microservices, a failure message.

13. The method according to claim 9, wherein a begin transaction event message is transmitted at a beginning of a transaction involving said plurality of microservices.

14. The method according to claim 13, wherein an end transaction event is transmitted at an end of a transaction involving said plurality of microservices.

15. A computer program product including one or more non-transitory machine-readable mediums encoded with instructions that when executed by one or more processors cause a process to be carried out for always strictly consistent modification of data in a plurality of data stores, the process comprising:

calling a first data API with a first data modification request, wherein said first data modification request includes a first no-commit instruction;

receiving a first data modification response from said first data API, wherein said first data modification response includes a pseudo-identifier;

calling a second data API with a second modification request including said pseudo-identifier, wherein said second data modification request includes a second no-commit instruction;

receiving a second data modification response from said second data API;

calling said first data API with a third data modification request, wherein said third data modification request is a replay of said first data modification request but without the first no-commit instruction;

receiving a third data modification response from said first data API, wherein said third data modification response includes a real identifier associated with said pseudo-identifier; and, calling said second data API with a fourth data modification request, wherein said fourth data modification request is a replay of said second data modification request but without the second no-commit instruction, and wherein said fourth data modification request is generated by replacing said pseudo-identifier with said associated real identifier such that data modified by said second data API is always strictly consistent with data modified by said first data API.

16. The computer program product according to claim 15, wherein each of said first and second no-commit instructions includes information instructing a respective one of said first and second data APIs to perform a data validation and not to perform a commit.

17. The computer program product according to claim 16, wherein said first no-commit instruction further includes information instructing said first data API to generate and return said pseudo identifier.

18. The computer program product according to claim 15, wherein a map structure is used to associate said pseudo-identifier with said real identifier.

19. The computer program product according to claim 15, wherein said real identifier is a foreign key.

20. The computer program product according to claim 15, wherein each of said first and second no-commit instructions includes a prepare phase header.

* * * * *